(No Model.)
W. FREAR.
POP CORN BALLING MACHINE.
No. 451,119. Patented Apr. 28, 1891.
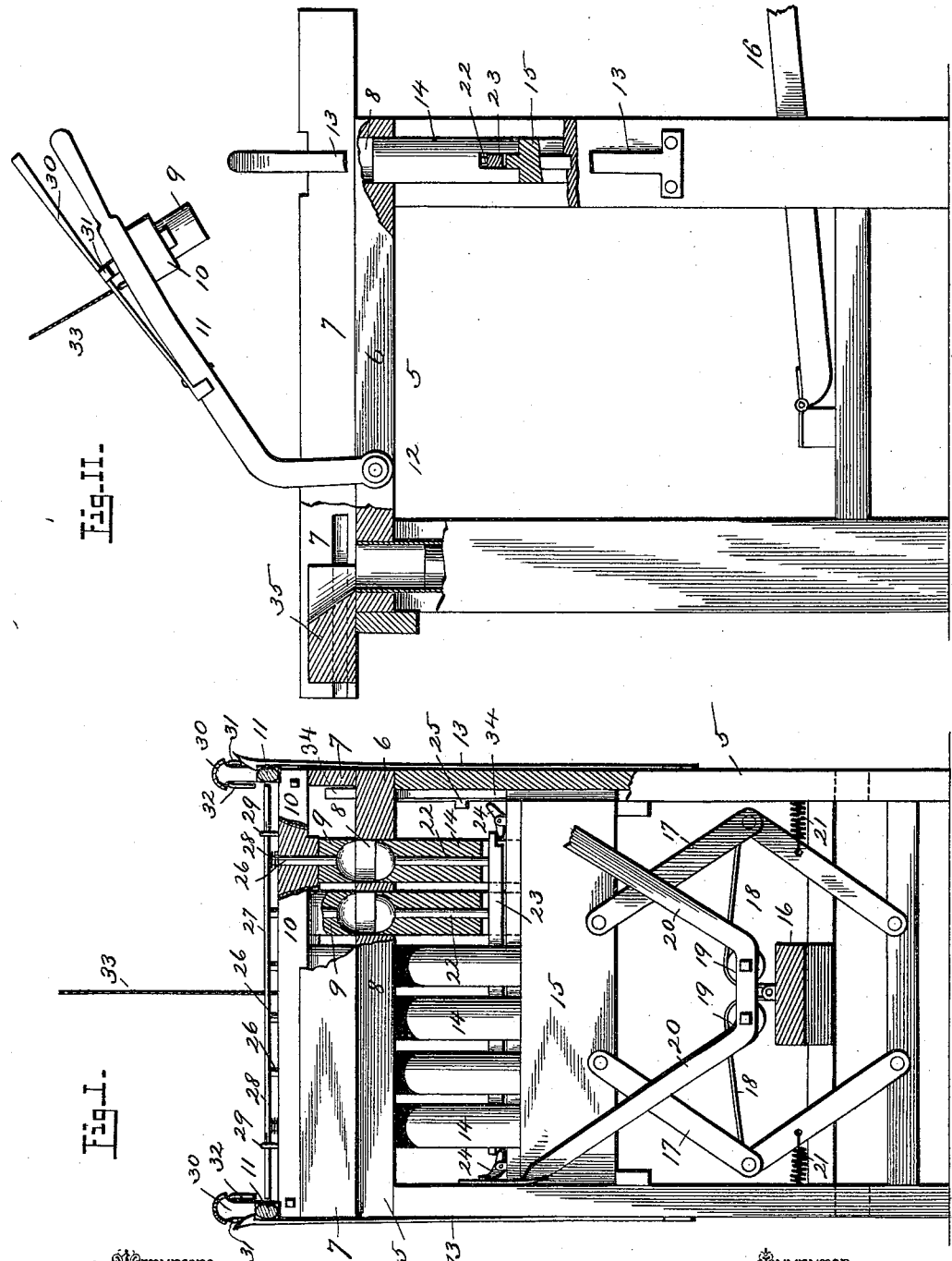
WITNESSES.  
INVENTOR.  
William Frear

UNITED STATES PATENT OFFICE.

WILLIAM FREAR, OF ITHACA, NEW YORK.

POP-CORN-BALLING MACHINE.

SPECIFICATION forming part of Letters Patent No. 451,119, dated April 28, 1891.

Application filed December 12, 1890. Serial No. 374,454. (No model.)

*To all whom it may concern:*

Be it known that I, WILLIAM FREAR, a citizen of the United States, residing at Ithaca, in the county of Tompkins and State of New York, have invented certain new and useful Improvements in Pop-Corn-Balling Machines; and I do hereby declare the following to be a full, clear, and exact description of the invention, such as will enable others skilled in the art to which it appertains to make and use the same.

This invention relates to machines for making pop-corn balls; and its object is to provide means whereby large quantities of pop-corn, sugared or otherwise prepared, may be rapidly made up into balls of uniform size or into cylinders in suitable form for retail trade.

To this end my invention consists in the construction and combination of parts forming a "pop-corn-balling machine," hereinafter described and claimed, reference being had to the accompanying drawings, in which—

Figure I is a front view, partly in vertical section, of a pop-corn-balling machine in working position according to my invention. Fig. II is a side elevation with the backers raised for filling the molds, certain parts being broken away.

5 represents the frame of the machine supporting a table 6, surrounded by raised side boards 7, forming a trough, into which the popped corn may be poured in bulk after having been suitably prepared by mixture in the usual way with any flavoring or sugary matter.

Through the table along the front of the machine I provide a series of holes 8, shaped as molds or receptacles for the corn.

9 represents a series of hemispherical inverted cups attached to a cross-beam 10, mounted on arms 11, which are pivoted to the frame at 12, so that when the cups are brought forward and downward upon the table they register, respectively, with the molds 8.

13 represents a pair of strong spring-hooks fastened at their lower ends to the main frame, their hook portions being adapted to engage the arms 11 when the cups are down in place for service.

14 represents a series of pistons, hemispherically cup-shaped at their upper ends and fitted to slide neatly within the molds 8.

15 is a cross-head upon which the pistons 14 are secured. This cross-head is fitted to slide vertically in grooved ways in the side posts of the frame.

16 is a foot-lever or treadle pivoted at its rear end in the frame and connected midway with knuckle-joint braces 17 by means of straps 18, running over pulleys 19, which are journaled in hangers 20, fixed to the frame. Downward pressure upon the treadle draws the knuckle-joints 17 toward each other, thus extending and lengthening the braces, the lower ends of which are pivoted to the cross-beam of the main frame and their upper ends pivoted to the cross-head 15, whereby the cross-head is raised at every downward pressure of the treadle, and the latter end of the pressure exerts the enormous force upon the pistons which the knuckle-joint braces are known to exert.

21 represents springs attached at one end to the side frame and at the other end to the braces 17, whereby the braces are constantly pulled outward to release them when drawn nearly into straight line and permit them, with the cross-head and piston, to gravitate to their normal position of rest after each service.

22 represents a series of ramrods fitted to slide within the pistons, and 23 is a cross-bar upon which all the ramrods stand, with their upper ends just high enough to shape the lower portion of the ball.

24 represents a pair of latches pivoted upon the cross-head 15, with one end of each under an end of the cross-bar 23 and the other end in a raised position to engage the stop-lug 25, fixed upon each side post of the frame.

26 represents a series of ramrods within the upper cups 9, and 27 is a cross-bar to which these ramrods are attached.

28 represents springs adapted to lift the cross-bar upward against the restraining-staples 29, whereby the ramrods are held with their lower ends in position to form the extreme upper side of the balls.

30 represents a pair of hand-latches secured at their rear ends to the arms 11 and adapted to spring normally upward at their forward ends.

31 is a lug projecting from the side of each latch to engage the slanting end of the spring-hook 13, whereby these springs will be disengaged from the arms 11 when the latches are pressed downward.

32 represents other lugs on the opposite side of each latch and adapted to engage the cross-bar 27 after the hooks have been disengaged.

33 is a cord connected with a weight which so nearly balances the cross-beam 10 and its attachments that very little power is required upon the handles of arms 11 to operate the cups 9.

The operation is as follows: A quantity of corn having been placed upon the table, the lever and cups are to be raised, as shown in Fig. II. Then enough corn is brought forward over the molds to fill them level with the table and the surplus stricken back out of the way. Then the cups are to be brought down firmly upon the table, when the arms 11 will be engaged and held by the hooks 13. Then the foot-treadle being pressed down forces the pistons up through the molds, crowding the corn up into the hemispheres 9, located above the level of the table, and presses the ball of corn very firmly in each mold. The amount that the pistons can raise is limited by stop-rods 34, fitted to slide in the side grooves on top of the cross-head 15, their upper ends being adapted to engage the under side of the cross-beam 10 when the desired limit of motion is reached. After the balls have thus been formed the operator in grasping the handles upon arms 11 also closes his hands upon the hand-latches 30, whereby the hooks 13 are disengaged from the arms 11, and then the cross-bar 27 is pressed downward by a continued pressure of the hand-latches, whereby the ramrods 26 are pressed down to disengage the balls from the upper cups. The balls, being formed half above the level of the table, are not likely to stick much in the lower cups; but if they do stick the treadle may be pressed down a little more after the cross-beam 10 is out of the way of the stop-rods 34. Then the latches 24 will meet at their outer ends the fixed lugs 25, and with their inner ends raise the cross-bar 23 and ramrods 22 to eject the balls from the lower cups. After removing the balls from the table the operation may be repeated with great rapidity, one person having sufficient power to press eight or ten balls at a single move of his foot so easily as to be able to continue it all day long. At the left-hand end of the machine a modification is shown in which the cups are dispensed with for the purpose of forming the corn into cylinder shapes with flat ends, as is done in some instances. In this case the cross-beam 10 and cups 9, which serve as a backing to support the corn against the pressure of the pistons, are substituted by a cross-beam 35, fitted at its ends to slide in ways in the raised sides of the table, thus forming a plain backing to resist the pressure from below in forming the cylinders of corn, and after the cylinders are formed the pistons may rise bodily by the continued action of the foot-lever after the backing 35 has been moved back out of the path of the stop-rods in a manner similar to that described of the treadle 16.

Having thus fully described my invention, what I believe to be new, and desire to secure by Letters Patent, is the following:

1. The combination, in a pop-corn-balling machine, of a table having a series of molds formed through it in a line, a series of cups mounted on arms pivoted to the frame to close down upon the table in registry with the said molds, spring-catches for holding the cup-frame, a series of pistons fitted to slide vertically within the molds, a cross-head fitted to slide in the frame to carry the said pistons, a pair of knuckle-jointed braces pivotally connected with the said cross-head at one end and with the frame at the other, a treadle, and connections between it and the knuckle-jointed braces, substantially as described.

2. The combination of a table having a series of molds formed in it in a line crossing it, a backing removably fitted to cover the said molds, a series of pistons fitted to slide in the said molds and mounted on a cross-head fitted to slide in the frame, a series of ramrods fitted within the pistons and resting upon a cross-bar, a pair of latches pivoted to the said cross-head to engage at one end the said cross-bar, and a lug fixed at the end of the path of each said latches, and means for operating the cross-head, substantially as described.

3. The combination of a table having molds formed in it, a backing removably fitted to cover the molds, a series of pistons mounted upon a sliding cross-head to engage the molds, a pair of stop-rods fitted to ride upon the said cross-head to engage the said backing, and means for operating the cross-head, substantially as described.

4. The combination of a table provided with a series of molds, a backing or cover for the molds, mounted on arms pivoted to the table, spring-catches adapted to engage the said arms, and hand-latches upon the arms, having lugs fitted for wedging engagement with the said springs, substantially as described.

5. The combination of a table provided with a series of molds, a backing or covers for the molds, mounted on arms pivoted to the table, catches for the said arms, a series of ramrods fitted through the said backing or covers and secured to a cross-bar, and hand-latches upon the said arms provided with lugs to engage the said cross-bar, substantially as described.

6. The combination of a table provided with a series of molds, a backing or covers for the molds, mounted on arms pivoted to the table, catches for the said arms, a series of ramrods fitted through the said backing or covers and secured to a cross-bar, and hand-latches upon the said arms having one pair of lugs adapted to engage the said catches and another pair of lugs adapted to engage the said cross-bar a little later, substantially as described.

In testimony whereof I affix my signature in presence of two witnesses.

WILLIAM FREAR.

Witnesses:
F. W. PHILLIPS,
A. E. BALL.